US011477683B2

(12) United States Patent
Bai et al.

(10) Patent No.: US 11,477,683 B2
(45) Date of Patent: Oct. 18, 2022

(54) EVENT TRIGGERED UPLINK BEAM REPORT

(71) Applicant: QUALCOMM Incorporated, San Diego, CA (US)

(72) Inventors: Tianyang Bai, Somerville, NJ (US); Yan Zhou, San Diego, CA (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 116 days.

(21) Appl. No.: 17/098,065

(22) Filed: Nov. 13, 2020

(65) Prior Publication Data

US 2021/0243630 A1 Aug. 5, 2021

Related U.S. Application Data

(60) Provisional application No. 62/968,878, filed on Jan. 31, 2020.

(51) Int. Cl.
*H04W 24/10* (2009.01)
*H04W 72/04* (2009.01)
(Continued)

(52) U.S. Cl.
CPC .......... *H04W 24/10* (2013.01); *H04B 17/318* (2015.01); *H04L 1/1614* (2013.01);
(Continued)

(58) Field of Classification Search
CPC .................. H04W 52/365; H04W 72/0413
See application file for complete search history.

(56) References Cited

U.S. PATENT DOCUMENTS

2018/0042000 A1\* 2/2018 Zhang ............... H04B 7/088
2019/0230529 A1\* 7/2019 Sadiq ............... H04W 24/04
(Continued)

FOREIGN PATENT DOCUMENTS

| EP | 3280068 A1 | 2/2018 |
|---|---|---|
| WO | 2018183991 A1 | 10/2018 |
| WO | 2019134749 A1 | 7/2019 |

OTHER PUBLICATIONS

Intel Corporation: "Solution Enhancements to Mitigate Link Failures in FR2", 3GPP Draft, 3GPP RAN4 WG Meeting #92Bis, R4-1912287, 3rd Generation Partnership Project (3GPP), Mobile Competence Centre, 650, Route Des Lucioles, F-06921 Sophia-Antipolis, vol. RAN WG4, No. Chongqing, China, Oct. 14, 2019-Oct. 18, 2019, Oct. 4, 2019 (Oct. 4, 2019), XP051807017, pp. 1-3, From the Internet: URL: https://ftp.3gpp.org/tsg_ran/WG4_Radio/TSGR4_92Bis/Docs/R4-1912287.zip R4-1912287 [retrieved on Oct. 4, 2019] section 2.2.2 Beam failure reporting, p. 2.
(Continued)

*Primary Examiner* — Fahmida S Chowdhury
(74) *Attorney, Agent, or Firm* — Procopio, Cory, Hargreaves & Savitch LLP

(57) ABSTRACT

A user equipment (UE) determines an occurrence of an event based on one or more of criteria determined by the UE or a configuration from a base station, the event triggering an uplink beam report for the UE. Then, the UE sends the uplink beam report to a base station in response to determining the occurrence of the event. A base station configures a UE for an event that triggers an uplink beam report from the UE and receives the uplink beam report from the UE based on an occurrence of the event.

30 Claims, 9 Drawing Sheets

(51) Int. Cl.
  *H04W 52/36* (2009.01)
  *H04L 1/16* (2006.01)
  *H04W 80/02* (2009.01)
  *H04B 17/318* (2015.01)

(52) U.S. Cl.
  CPC ....... *H04W 52/365* (2013.01); *H04W 72/046* (2013.01); *H04W 72/0413* (2013.01); *H04W 80/02* (2013.01)

(56) References Cited

U.S. PATENT DOCUMENTS

2020/0067590 A1* 2/2020 Wang .................... H04B 17/318
2020/0336195 A1* 10/2020 Hu ........................ H04B 7/0695
2021/0021321 A1* 1/2021 Liu ........................ H04W 76/18

OTHER PUBLICATIONS

International Search Report and Written Opinion—PCT/US2021/012975—ISA/EPO—dated Apr. 21, 2021.
Qualcomm Incorporated: "Enhancements on Multi-Beam Operation", 3GPP TSG RAN WG1 Meeting #103-e, 3GPP Draft, R1-2009250, 3rd Generation Partnership Project (3GPP), Mobile Competence Centre, 650, Route Des Lucioles, F-06921 Sophia-Antipolis Cedex, France, vol. RAN WG1, No. e-meeting, Oct. 26, 2020-Nov. 13, 2020, 12 Pages, Oct. 24, 2020 (Oct. 24, 2020), XP051946913, From the Internet: URL: https://ftp.3gpp.orgjtsg ran/WG1_RL1/TSGR1_103-e/Docs/R1-2009250.zip R1-2009250 [retrieved on Oct. 24, 2020] p. 8-p. 9.

* cited by examiner

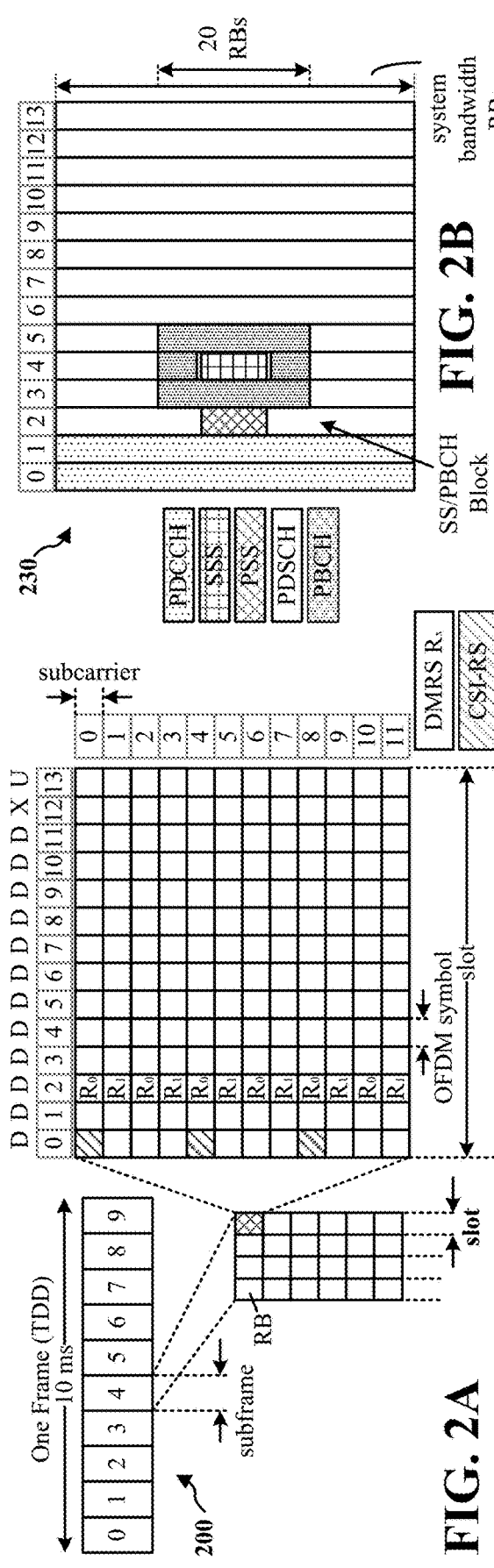
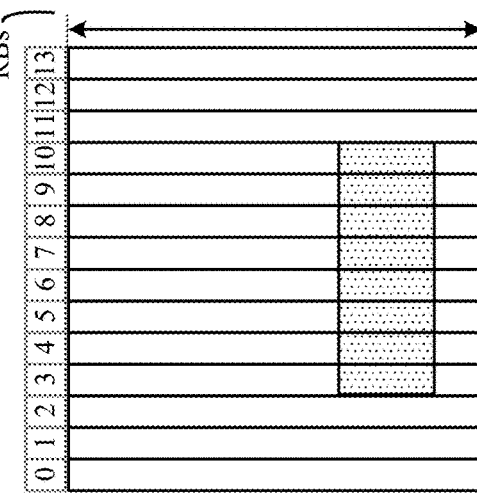
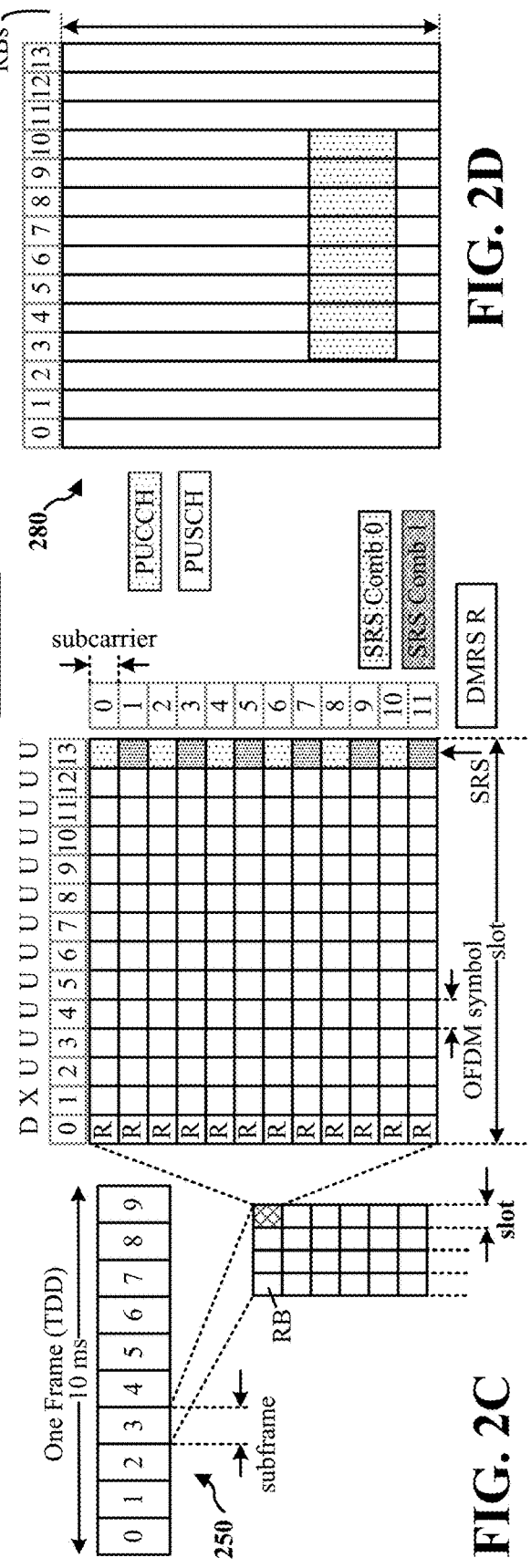
FIG. 2A
FIG. 2B
FIG. 2C
FIG. 2D

EVENT TRIGGERED UPLINK BEAM REPORT

CROSS REFERENCE TO RELATED APPLICATION

This application claims the benefit of U.S. Provisional Application Ser. No. 62/968,878, entitled "Event Triggered Uplink Beam Report" and filed on Jan. 31, 2020, which is expressly incorporated by reference herein in its entirety.

BACKGROUND

Technical Field

The present disclosure relates generally to communication systems, and more particularly, to wireless communication using directional beams.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus determines, at the UE, an occurrence of an event based on one or more of criteria determined by the UE or a configuration from a base station, the event triggering an uplink beam report for the UE. The apparatus sends the uplink beam report to a base station in response to determining the occurrence of the event.

In an aspect of the disclosure, a method, a computer-readable medium, and an apparatus are provided for wireless communication at a base station. The apparatus configures a UE for an event that triggers an uplink beam report from the UE. Then, the apparatus receives the uplink beam report from the UE based on an occurrence of the event.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
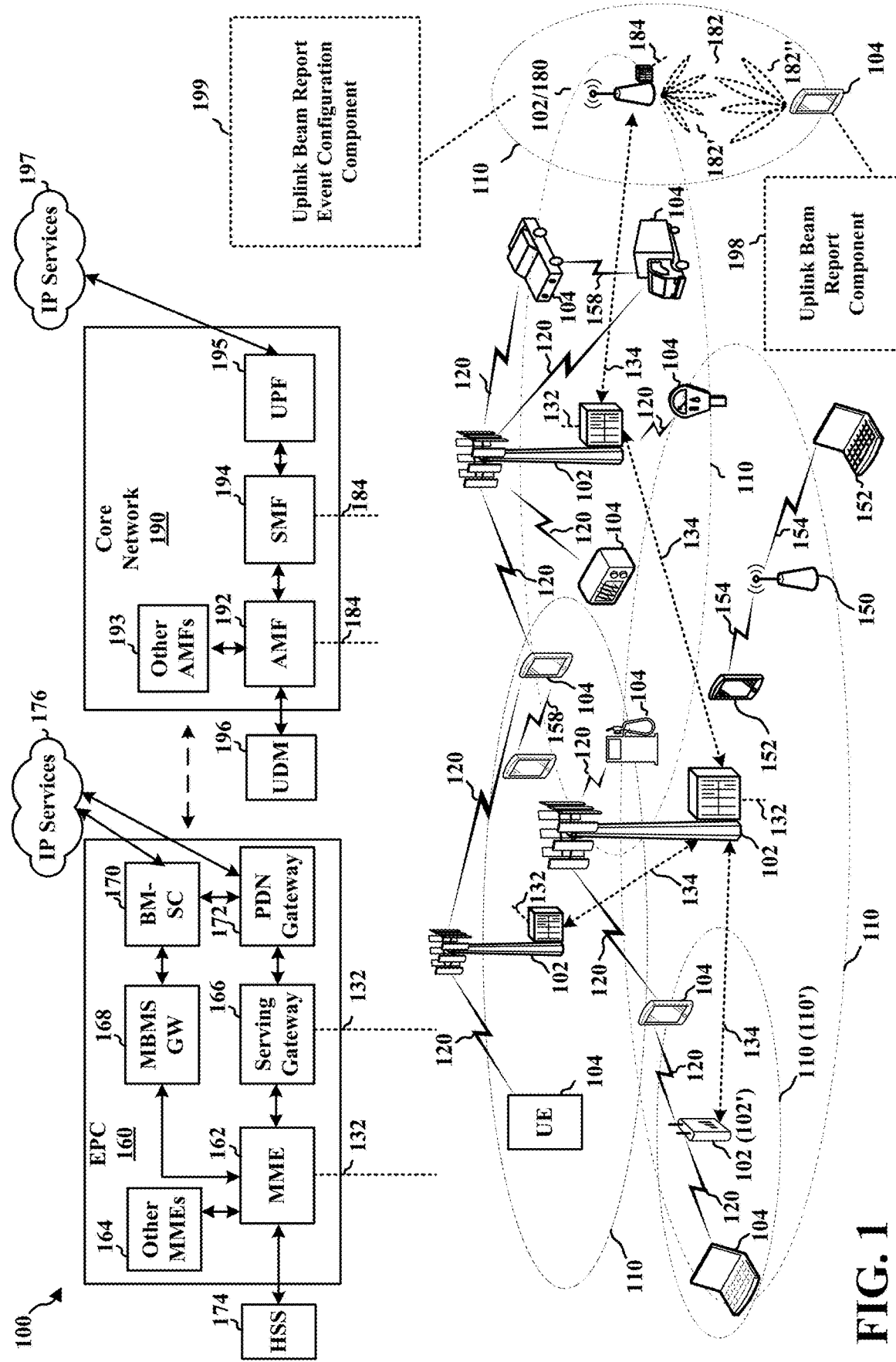
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The UE, such as a millimeter wave (mmW) UE, may use beamforming to improve wireless communication with a base station. Directional beamforming concentrates a transmission power in a reduced angular domain around an intended transmission direction. Output energy (e.g. in terms of Equivalent Isotropically Radiated Power (EIRP)) in the angle of the beamformed transmission can be potentially higher than for an omni transmission. A maximum permissible exposure (MPE) level may provide a highest energy density that can be exposed to or near a human body. The MPE value may be defined by standards or regulations. The UE may reduce uplink transmission power based on the MPE restrictions to reduce exposure to a body part in the direction of the uplink transmission. For example, a user's fingers or hands may be placed near the transmission antenna while a user holds the wireless device. The MPE restrictions may be more stringent for a mmW band (e.g., 30-300 GHz) as the electromagnetic wave in the mmW band may cause various human body resonances.

An uplink transmission on an uplink beam that had a good quality prior to a reduction in transmission power may experience a beam failure following the reduction of the transmission power. After a UE reports an uplink beam failure, whether due to MPE or to other causes, the base station may use a new uplink beam to communicate with the UE. If conditions at the UE change, such as a user moving their hand relative to transmission antenna(s), the UE may be able to use a higher transmission power that improves the beam quality of the previously failed beam. Although the base station may periodically request a beam report from the UE, the delay between the changed condition and the beam report may increase latency in reselecting to the beam. Aspects presented herein improve latency for the base station to reselect to a beam while also avoiding an increase of signaling between the base station and UE to increase such periodic beam reporting by triggering the UE to provide an uplink beam report based on the occurrence of an event. In some examples, the UE may autonomously determine to send an uplink beam report based on the occurrence of the event, e.g., without a request from the base station that triggers the beam report. In some examples, the UE may determine the occurrence of the event based on a configuration from the base station. The UE may indicate an additional metric about the beam(s) in the beam report. For example, the UE may indicate a subset of beams having better measurements and may additionally provide information about the subset of beams, such as an available power headroom or an estimated uplink reference signal received power (RSRP). The beam report may provide the base station with more accurate beam information and may enable the base station to select an uplink beam for communication with the UE in a more efficient manner.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronic s Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it may be understood that the term "sub-6 GHz" or the like if used herein may broadly represent frequencies that may be less than 6 GHz, may be within FR1, or may include mid-band frequencies. Further, unless specifically stated otherwise, it may be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include an uplink beam report component 198 configured to determine, at the UE, an occurrence of an event based on one or more of criteria determined by the UE or a configuration from a base station, the event triggering an uplink beam report for the UE 104. Then, the uplink beam report component 198 may be configured to send the uplink beam report to the base station 102 or 180 in response to determining the occurrence of the event. The event may be an autonomous event determined by the UE or may be based on a configuration from the base station. Therefore, the base station 102, 180 may include an uplink beam report event configuration component 199 that configures the UE 104 for the event that triggers an uplink beam report from the UE. For example, the UE may report a top number of uplink beams whenever the top set of uplink beams changes, e.g., a number of uplink beams having better measurements.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^{\mu}$ slots/subframe. The subcarrier spacing and symbol length/duration are a function of the numerology. The subcarrier spacing may be equal to $2^{\mu}*15$ kHz, where µ is the numerology 0 to 4. As such, the numerology µ=0 has a subcarrier spacing of 15 kHz and the numerology µ=4 has a subcarrier spacing of 240 kHz. The symbol length/duration is inversely related to the subcarrier spacing. FIGS. 2A-2D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
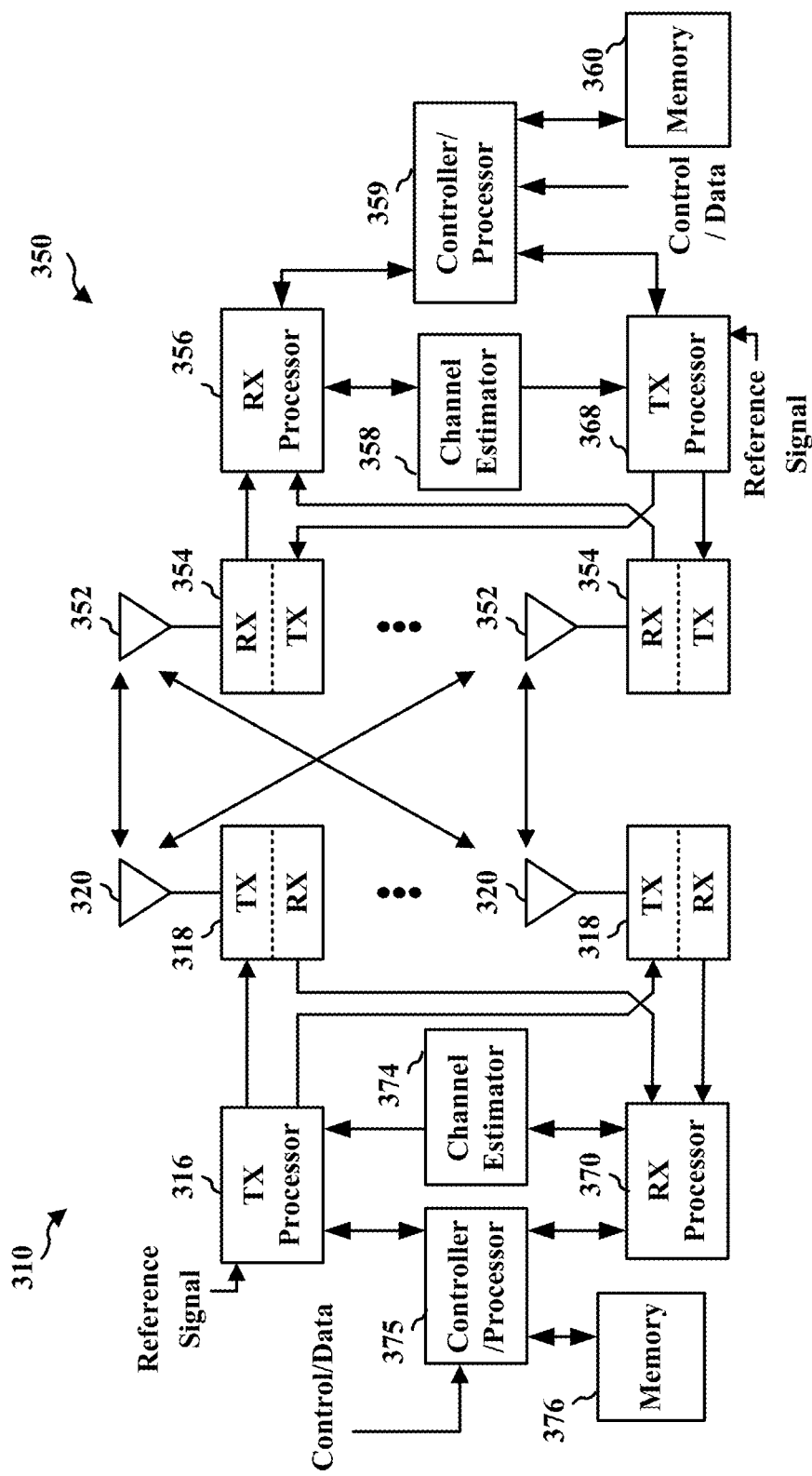
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

As described in connection with FIG. 1, a base station 102 or 180 and UE 104 may operate in mmW frequencies, and/or near mmW frequencies to communicate with the UE 104. Communications using the mmW/near mmW radio frequency (RF) band (e.g., 3 GHz-300 GHz) may experience high path loss and a short range. The base station may utilize beamforming, e.g., as illustrated at 182 in FIG. 1, with the UE 104 to compensate for the path loss and short range of a mmW signal. Similarly, a mmW UE may use perform directional beamforming to boost power of uplink transmissions to the base station.

The base station 102 or 180 and UE 104 may perform beam training to determine the best receive and transmit directions, e.g., downlink beams and uplink beams, for each of the base station 102 or 180 and UE 104. The transmit and receive directions, e.g., downlink beams and uplink beams, for the base station 102 or 180 may or may not be the same. The transmit and receive directions, e.g., downlink beams and uplink beams, for the UE 104 may or may not be the same.

Figure 4:
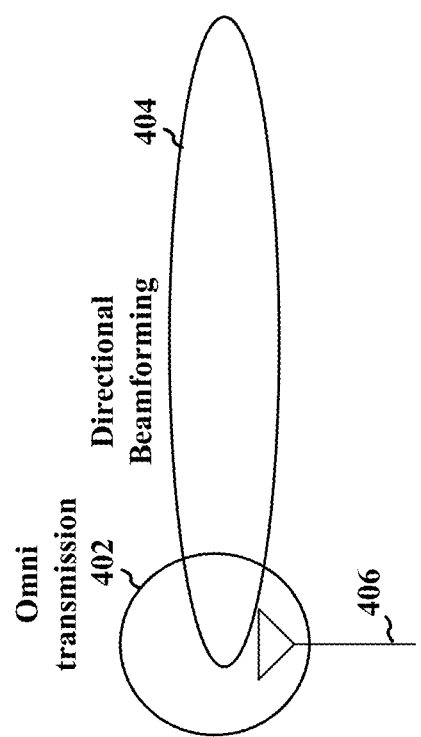
FIG. 4 illustrates an example omni transmission and a beamformed transmission.

FIG. 4 illustrates an example transmission pattern 402 or shape for an antenna 406 transmitting using an omni transmission and an example beam 404 for the antenna 406 transmitting using a directional beam. The base station 102 or 180 and the UE 104 may each include a plurality of antennas, such as antenna elements, antenna panels, and/or antenna arrays to facilitate the beamforming. Directional beamforming concentrates a transmission power in a smaller angular domain around the intended transmission direction. Output energy (e.g. in terms of Equivalent Isotropically Radiated Power (EIRP)) in the angle of the beamformed transmission 404 can be potentially higher than for an omni transmission such as 402.

A maximum permissible exposure (MPE) level provides a highest energy density that can be exposed to or near a human body. The MPE value may be defined by standards or regulations. The MPE restrictions may limit some operation for a wireless device, e.g., placing limits on uplink transmission for a UE. The MPE restrictions may be more stringent for a mmW band (e.g., 30-300 GHz) as the electromagnetic wave in the mmW band may cause various human body resonances.

The MPE may be based on a consideration of the exposure to a human body near the transmission antenna, such as a user's fingers or hands that may be placed near the transmission antenna while a user holds the wireless device, e.g., rather than other objects that may be near the phone. Therefore, a mmW device may have components to detect whether a part of a human body is within a range of a transmitter. The mmW device may use a radar, a sensor, etc. to detect the presence of a body part near transmission antenna(s). When a body part is detected within a range of the transmitter, the wireless device may reduce a transmission power of the affected antenna(s) in order to meet the MPE limit. An uplink transmission on an uplink beam that had a good quality prior to a reduction in transmission power may not be usable to communicate with a base station following the reduction in the transmission power. The uplink beam may experience a beam failure following the reduction of the transmission power based on an MPE. The base station may respond to the beam failure by selecting a new uplink beam for the UE.

After a UE reports an uplink beam failure, whether due to MPE or to other causes, the base station may use a new uplink beam with the UE. Conditions at the UE may change, such as a user moving their hand relative to transmission antenna(s). The base station may be able to improve uplink beam selection if the base station has received more accurate information about the uplink beams, such as when a failed beam improves and can be reselected for uplink communication with the UE. As the beam failure may have been due to a reduction of transmission power due to MPE, a change in a location of a user's hand may resolve the MPE issue, and the failed uplink beam may continue to have a better path loss among the UE's possible beams. With updated information, the base station may be able to switch the uplink beam upon the change at the UE. The base station may periodically request a report of a subset of beams from the UE, e.g., the X beams having the best beam quality measurements. While such reports may help the base station to be aware of changing beam conditions at the UE, the request for the beam report involves added signaling from the base station. Additionally, periodic, or time based, beam reports may waste wireless resources by transmitting information that does not assist the base station in making a new beam selection. The base station may reduce the use of wireless resources by requesting and/or providing uplink beam reports using a longer period of time. However, a longer period of time could introduce latency in providing the base station with updated beam information, and therefore latency in selecting an improved beam. Aspects presented herein provide beam information to the base station in a manner that uses wireless resources in an efficient manner while also avoiding latency through the use of an event triggered uplink beam report. Aspects presented herein improve latency for the base station to reselect to a beam while also avoiding an increase of signaling between the base station and UE to increase such periodic beam reporting by triggering the UE to provide an uplink beam report based on the occurrence of an event.

In some examples, the UE may autonomously determine to send an uplink beam report based on the occurrence of the event, e.g., without a request from the base station that triggers the beam report. In some examples, the UE may determine the occurrence of the event based on a configuration from the base station.

Figure 5:
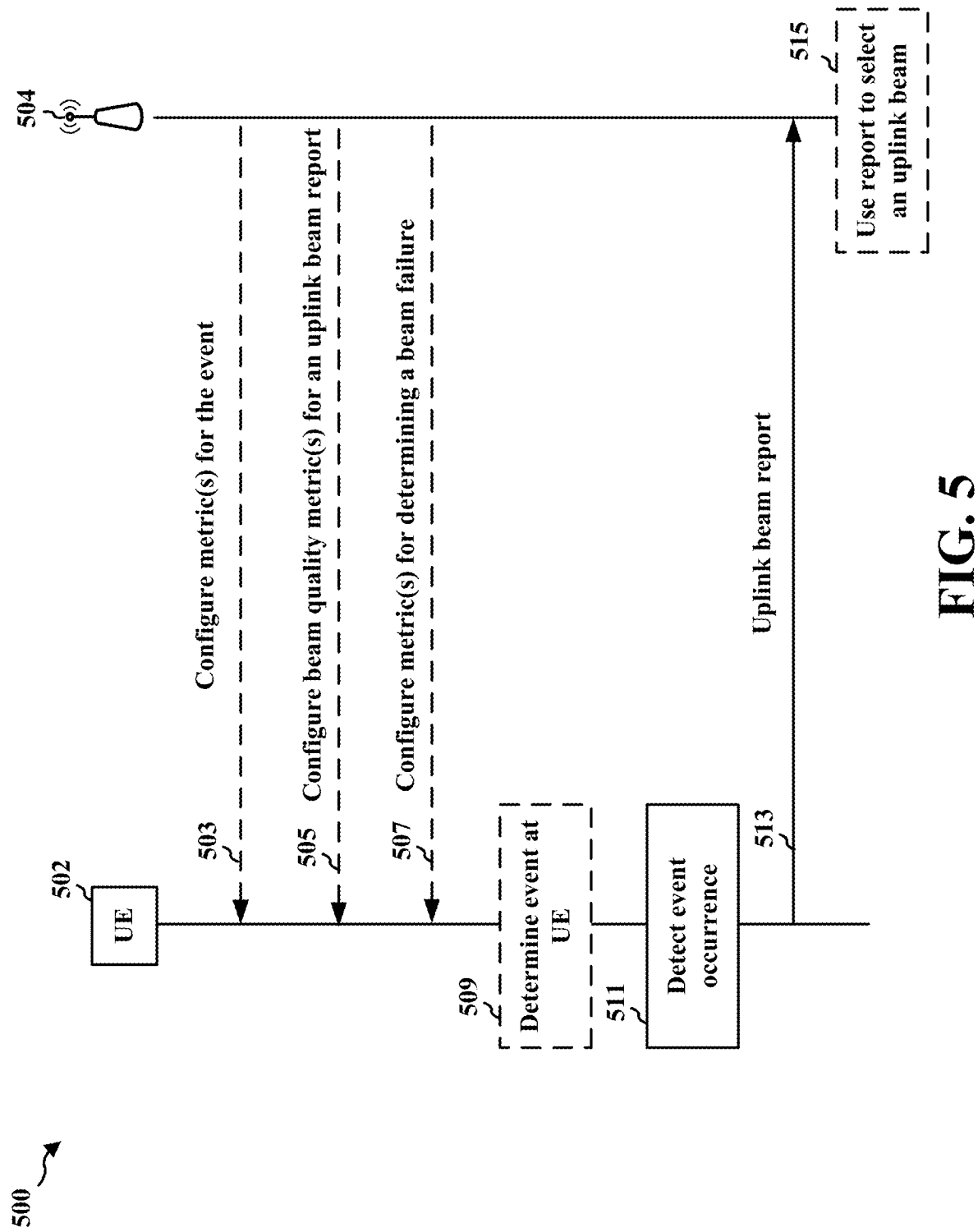
FIG. 5 is an example communication flow between a UE and a base station.

FIG. 5 illustrates an example communication flow 500 between a UE 502 and a base station 504 that includes event triggered uplink beam reporting. Optional aspects are illustrated with a dashed line. The event triggered uplink beam report may provide the base station 504 with information about failed beams that may improve. The event triggered uplink beam report may assist the base station because the failed uplink beam may be the beam having a better path loss among the UE's potential uplink beams. The event triggered uplink beam report avoids latency by providing the report based on the occurrence of an event, such as a change in a set of top beams. Furthermore, the event triggered uplink beam report improves the efficient use of wireless resources by avoiding providing a report until the event has occurred.

As illustrated at 511, the UE 502 may detect that an event has occurred that triggers an uplink beam report to be sent by the UE 502 to the base station 504. In response to detecting the occurrence of the event at 511, the UE 502 may transmit the uplink beam report 513 to the base station 515. The particular event that triggers the UE 502 to send the uplink beam report 513 may be configured by the base station 504. For example, at 503, the base station 504 may configure the UE 502 for an event that triggers an uplink beam report. For example, the base station 504 may define the event and/or provide one or more metrics for the UE 502 to use or check to determine whether the event has occurred. Alternatively, the event may be based on criteria determined by the UE 502, e.g., autonomously determined by the UE 502 at 509.

As an example, the event may include a change in a set of one or more best beams. The set of one or more best beams may include a first number of beams having highest beam measurements among a larger number of beams measured by the UE. The change may include at least one beam improving or degrading to an extent that at least one beam in the set of the one or more best beams changes. Thus, the event that triggers the uplink beam report may be a change in the top X best uplink beams for the UE, X being an integer number.

The uplink beam report 513 may include abeam quality metric for each beam reported in the uplink beam report. The beam quality metric(s) in the report 513 may include or be based on at least one of an available power headroom or a measurement based on an uplink reference signal received power (RSRP). The beam quality metric may be determined as a maximum allowed uplink transmission power minus path loss, for example.

The UE 502 may receive a configuration 505 from the base station 504 for the beam quality metric. The base station 504 may configure one or more metrics and one or more thresholds for the UE 502 to use to determine and/or report beam quality of the uplink beams. Therefore, the beam quality metric that the UE 502 provides in the uplink beam report 513 may be based on the configured beam quality metric configuration 505 from the base station 504. As an example, the base station may configure the UE to determine and/or indicate when an available power headroom for an uplink beam is less than a threshold power headroom amount.

The uplink beam report 513 may indicate, for each uplink beam included in the uplink beam report, whether the beam suffers beam failure. For example, the uplink beam report 513 may include a bitmap for each configured uplink beam of the UE.

The base station 504 may send a configuration 507 to the UE 502 for determining the beam failure. The base station may configure one or more metrics and/or one or more thresholds for the UE to use in determining whether a particular beam has suffered from a beam failure. Therefore, the indication of whether or not a particular beam suffers from beam failure in the uplink beam report 513 may be based on one or more metrics configured by the base station 504 for the UE to determine beam failure. As an example, the base station may indicate that a beam failure is to be determined and/or indicated when an estimated uplink RSRP for a particular beam is less than a threshold RSRP. Thus, the base station 504 may configure a metric and a threshold for the UE 502 to determine an uplink beam quality and/or a beam failure.

In the uplink beam report 513, each reported uplink beam may be identified by an uplink beam indication identifier (ID). The uplink beam indication ID may be based on at least one of a spatial relation information ID, an uplink transmission configuration indication (TCI) state ID, and/or an uplink beam indication reference signal (RS) ID. The uplink beam indication ID in the uplink beam report may be based, e.g., on a downlink or uplink RS ID in spatial relation information or an uplink TCI state. The UE 502 may transmit the uplink beam report 513 to the base station 504 in a PUCCH, a medium access control-control element (MAC-CE), a scheduling request (SR), or an uplink random access transmission. For example, the UE 502 may send the uplink beam report 513 in an uplink grant request via an SR or in an uplink random access channel (RACH) transmission. In some aspects, the detection of the occurrence of an event 511 may lead to reporting changes in one or more IDs or parameters for one or more beams configured for the UE.

As illustrated at 515, the base station 504 may use information in the event triggered uplink beam report 513 to select an uplink beam for the UE 502.

Figure 6:
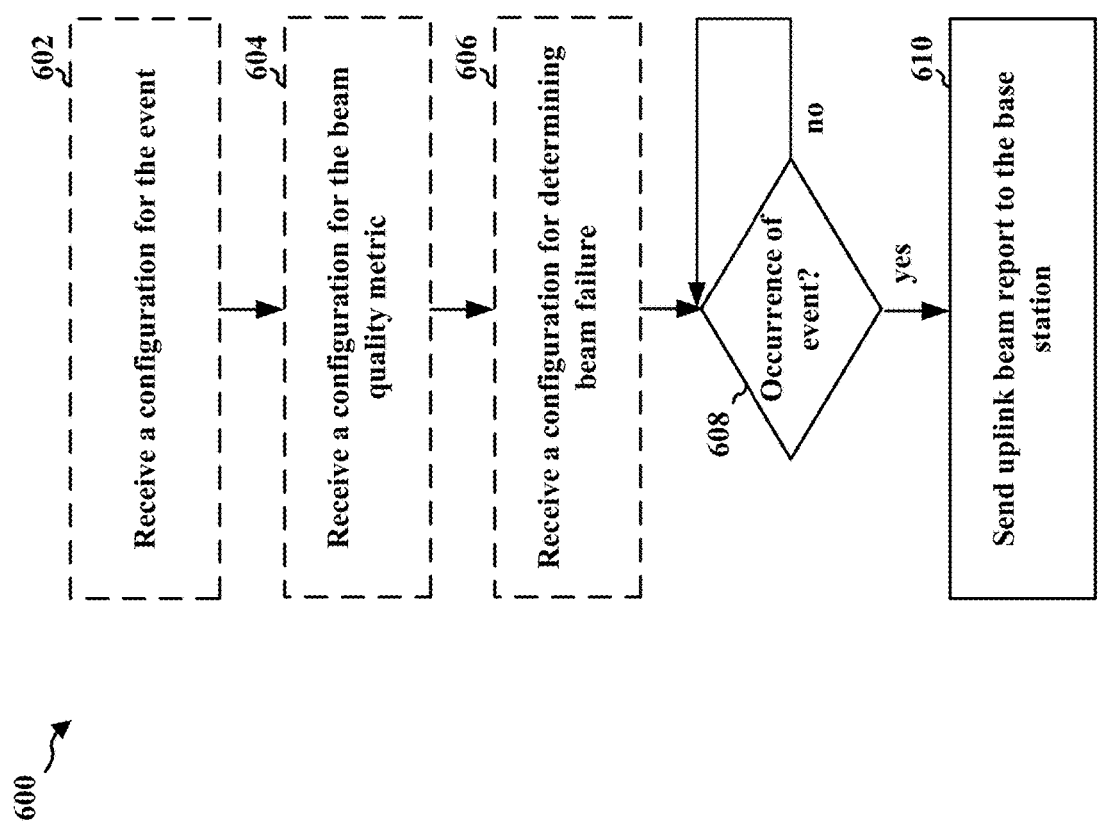
FIG. 6 is a flowchart of a method of wireless communication at a UE.

FIG. 6 is a flowchart of a method 600 of wireless communication. The method may be performed by a UE or a component of a UE (e.g., the UE 104, 350, 502; the apparatus 702; a processing system, which may include the memory 360 and which may be the entire UE 350 or a component of the UE 350, such as the TX processor 368, the RX processor 356, and/or the controller/processor 359). Optional aspects are illustrated with a dashed line. The method may provide beam information to the base station in a manner that uses wireless resources in an efficient manner while also avoiding latency.

At 608, the UE determines whether or not an event has occurred that triggers an uplink beam report for the UE. The determination may include aspects described in connection with the detection of the event, at 511 in FIG. 5. For example, the UE may determine the occurrence of the event based on one or more of criteria determined by the UE or a configuration from a base station, the event triggering the uplink beam report for the UE. When the UE determines, at 608, an occurrence of an event that triggers an uplink beam report for the UE, the UE proceeds to 610. Otherwise, the UE continues to wait for an occurrence of the event. The determination may be performed, e.g., by the event detection component 746 of the apparatus 702 in FIG. 7.

The event may be based on criteria determined by the UE, e.g., autonomously determined by the UE. Alternatively, the event may be based, at least in part, on information received from a base station, and the determining of the occurrence of the event, at 608, may be based on the criteria determined by the UE. Thus, at 602, the UE may receive a configuration from the base station for the event, and the determining of the occurrence of the event, at 608, may be based on the criteria received from the base station. The configuration may be received, e.g., by the event configuration component 740 of the apparatus 702 in FIG. 7. The configuration may be similar to the configuration 503 described in connection with FIG. 5. The base station may define the event and/or provide one or more metrics that the UE uses to determine whether the event has occurred. As an example, the event may include a change in a set of one or more beams, and the determining of the occurrence of the event, at 608, may include identifying the change in the set of the one or more beams. The set of one or more beams may include a first number of beams having highest beam measurements among a larger number of beams measured by the UE. Thus, the event that triggers the uplink beam report may be a change in the top X best uplink beams for the UE, X being an integer number.

At 610, the UE sends the uplink beam report to a base station in response to determining the occurrence of the event. The uplink beam report may be sent, e.g., by the beam report component 748 of the apparatus 702 in FIG. 7. The uplink beam report may include aspects described in connection with the uplink beam report 513 in FIG. 5. The uplink beam report may identify each beam using an uplink beam ID. The uplink beam ID may be based on at least one of a spatial relation information identifier, an uplink TCI state ID, or an uplink beam indication reference signal ID. The uplink beam report may be transmitted in a PUCCH, a MAC-CE, a scheduling request, or an uplink random access transmission.

The uplink beam report may include a beam quality metric for one or more beams reported in the uplink beam report, e.g., for each beam in the report. The beam quality metric(s) in the report may include or be based on at least one of an available power headroom or a measurement based on an uplink RSRP. The beam quality metric may be determined as a maximum allowed uplink transmission power minus path loss, for example.

As illustrated at 604, the UE may receive a configuration from the base station for the beam quality metric. The configuration may be received, e.g., by the beam quality metric component 742 of the apparatus 702 in FIG. 7. The configuration may include aspects described in connection with the configuration 505 in FIG. 5. Therefore, the beam quality metric that the UE provides in the uplink beam report may be based on the configured beam quality metric from the base station.

The uplink beam report may indicate, for one or more uplink beams included in the uplink beam report, whether the beam suffers beam failure. For example, for each beam in the report, the uplink beam report may indicate whether or not the beam in the report experiences a beam failure. For example, the uplink beam report may include a bitmap for each configured uplink beam of the UE.

As illustrated at 606, the UE may receive a configuration from the base station for determining the beam failure. The configuration may be received, e.g., by the beam failure component 744 of the apparatus 702. The configuration may include aspects described in connection with the configuration 507 in FIG. 5. Therefore, the indication of whether or not a particular beam suffers from beam failure in the uplink beam report may be based on one or more metrics configured by the base station for the UE to determine beam failure.

Figure 7:
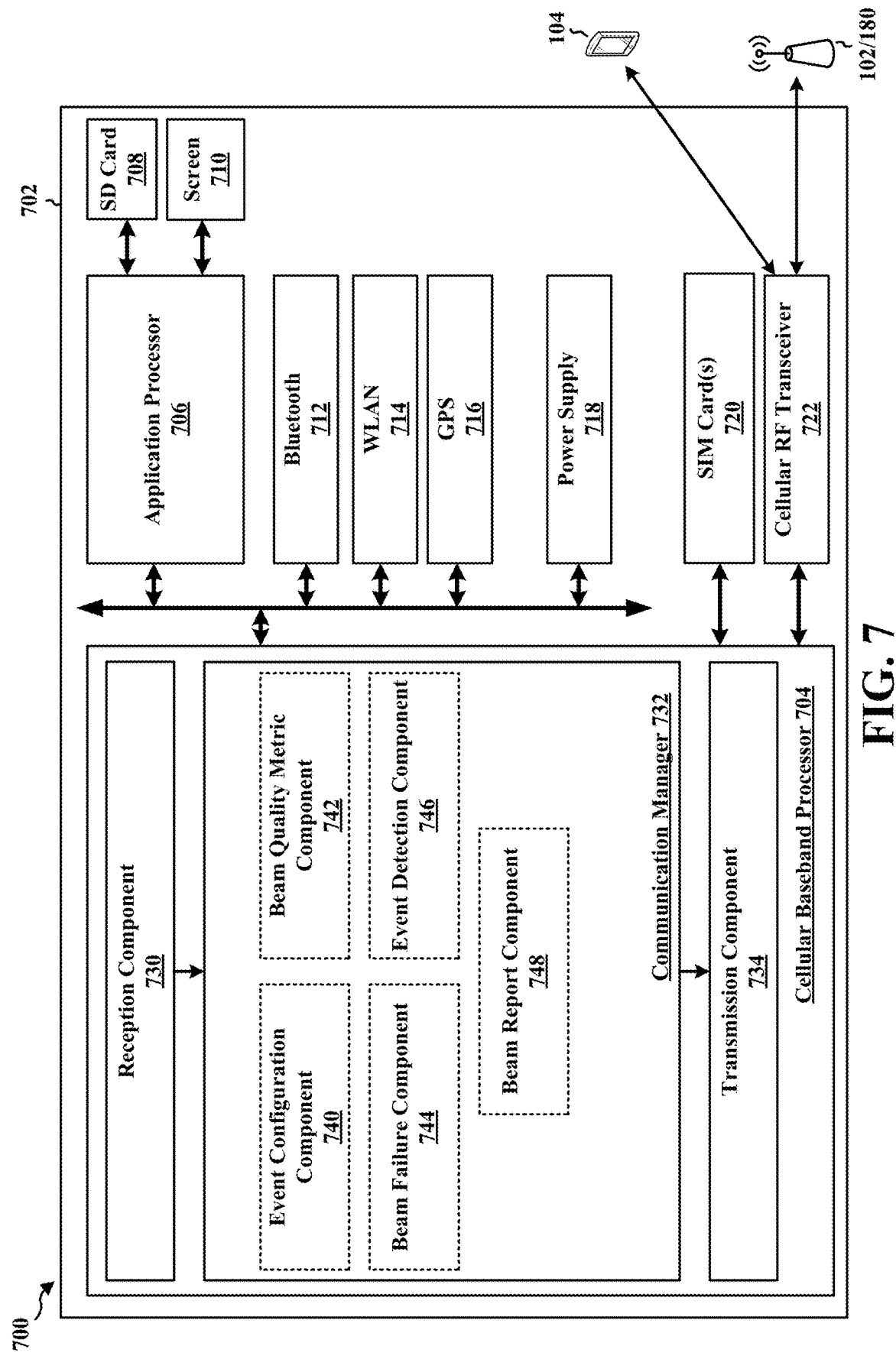
FIG. 7 is a diagram illustrating an example of a hardware implementation for an example apparatus for wireless communication at a UE.

FIG. 7 is a diagram 700 illustrating an example of a hardware implementation for an apparatus 702. The apparatus 702 is a UE and includes a cellular baseband processor 704 (also referred to as a modem) coupled to a cellular RF transceiver 722 and one or more subscriber identity modules (SIM) cards 720, an application processor 706 coupled to a secure digital (SD) card 708 and a screen 710, a Bluetooth module 712, a wireless local area network (WLAN) module 714, a Global Positioning System (GPS) module 716, and a power supply 718. The cellular baseband processor 704 communicates through the cellular RF transceiver 722 with the UE 104 and/or base station 102/180. The cellular baseband processor 704 may include a computer-readable medium/memory. The computer-readable medium/memory may be non-transitory. The cellular baseband processor 704 is responsible for general processing, including the execution of software stored on the computer-readable medium/memory. The software, when executed by the cellular baseband processor 704, causes the cellular baseband processor 704 to perform the various functions described supra. The computer-readable medium/memory may also be used for storing data that is manipulated by the cellular baseband processor 704 when executing software. The cellular baseband processor 704 further includes a reception component 730, a communication manager 732, and a transmission component 734. The communication manager 732 includes the one or more illustrated components. The components within the communication manager 732 may be stored in the computer-readable medium/memory and/or configured as hardware within the cellular baseband processor 704. The cellular baseband processor 704 may be a component of the UE 350 and may include the memory 360 and/or at least one of the TX processor 368, the RX processor 356, and the controller/processor 359. In one configuration, the apparatus 702 may be a modem chip and include just the baseband processor 704, and in another configuration, the apparatus 702 may be the entire UE (e.g., see 350 of FIG. 3) and include the additional modules of the apparatus 702.

The communication manager 732 includes an event configuration component 740 that is configured to receive a configuration from the base station for the event, wherein the determining the occurrence of the event is based on the configuration, e.g., as described in connection with 602 in FIG. 6. The communication manager 732 includes a beam quality metric component 742 that is configured to receive a configuration from the base station for the beam quality metric, e.g., as described in connection with 604 in FIG. 6. The communication manager 732 includes a beam failure component 744 that is configured to receive a configuration from the base station for determining the beam failure, e.g., as described in connection with 606 in FIG. 6. The communication manager 732 includes an event detection component 746 that is configured to receive the configurations from any of the event configuration component 740, the beam quality metric component 742, or the beam failure component 744, and to determine an occurrence of an event based on one or more of criteria determined by the UE or a configuration from a base station, the event triggering an uplink beam report for the UE, e.g., as described in connection with 608 in FIG. 6. The communication manager 732 includes a beam report component 748 that is configured to send the uplink beam report to a base station in response to determining the occurrence of the event, e.g., as described in connection with 610 in FIG. 6.

The apparatus may include additional components that perform each block in the aforementioned flowchart of FIG. 6 and aspects performed by the UE 502 in FIG. 5. As such, each block in the flowchart of FIG. 6 and the aspects performed by the UE 502 may be performed by at least one component of the apparatus 702 and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 702 for wireless communication, and in particular the cellular baseband processor 704, may include means for determining, at the UE, an occurrence of an event based on one or more of criteria determined by the UE or a configuration from a base station, the event triggering an uplink beam report for the UE, e.g., means for detecting or identifying the occurrence of the event as described in connection with 511 and 608, and means for sending the uplink beam report to a base station in response to determining the occurrence of the event. The determining the occurrence of the event may include detecting or identifying the occurrence of the event at 608. The apparatus 702 may further include means for receiving a configuration from the base station for the event. The apparatus 702 may further include means for receiving a configuration from the base station for the beam quality metric. The apparatus 702 may further include means for receiving a configuration from the base station for determining the beam failure. The means may be one or more of the aforementioned components of the apparatus and/or a processing system of the apparatus may be configured to perform the functions recited by the aforementioned means. The apparatus 702 may include the TX Processor 368, the RX Processor 356, and the controller/processor 359. As such, in one configuration, the aforementioned means may be the TX Processor 368, the RX Processor 356, and the controller/processor 359 configured to perform the functions recited by the means.

Figure 8:
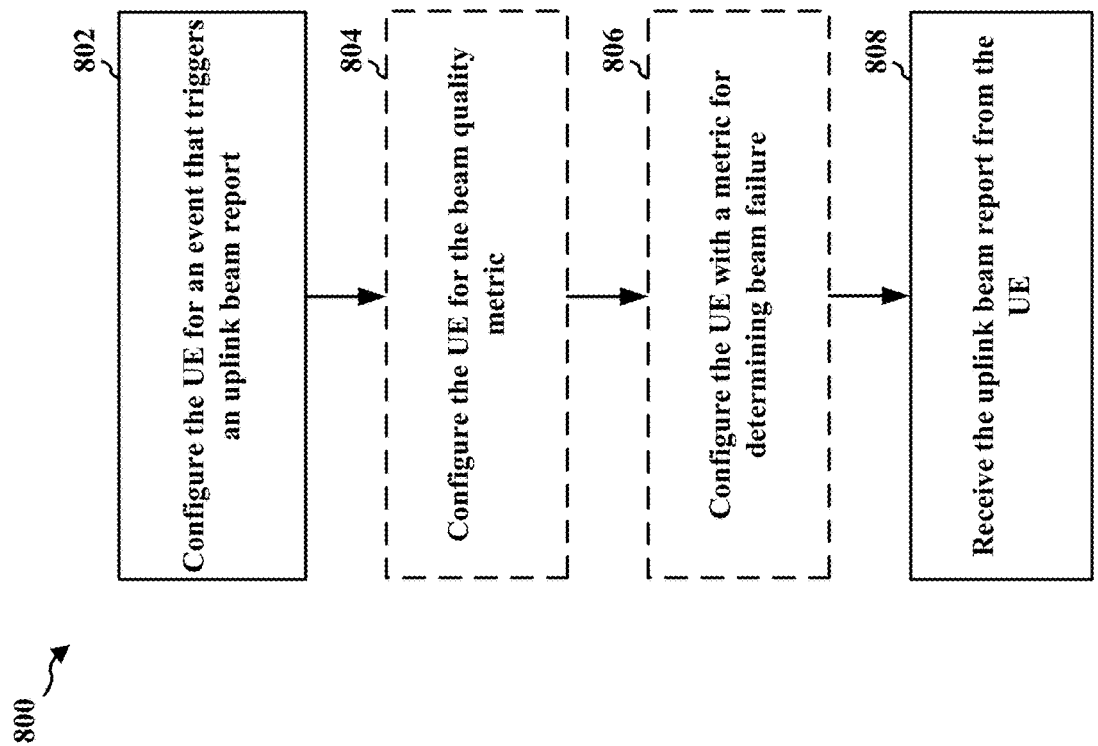
FIG. 8 is a flowchart of a method of wireless communication at a base station.

FIG. 8 is a flowchart of a method 800 of wireless communication. The method may be performed by a base station or a component of a base station (e.g., the base station 102, 180, 310, 504; the apparatus 902; a processing system, which may include the memory 376 and which may be the entire base station 310 or a component of the base station 310, such as the TX processor 316, the RX processor 370, and/or the controller/processor 375). Optional aspects are illustrated with a dashed line. The method may provide beam information to the base station in a manner that uses wireless resources in an efficient manner while also avoiding latency.

At 802, the base station configures a UE for an event that triggers an uplink beam report from the UE. The configuration may be performed, e.g., by the event configuration component 940 of the apparatus 902 in FIG. 9. The configuration may include aspects described in connection with the configuration 503 in FIG. 5. The base station may define the event and/or provide one or more metrics that the UE uses to determine whether the event has occurred. As an example, the event may include a change in a set of one or more beams. The set of one or more beams may include a first number of beams having highest beam measurements among a larger number of beams measured by the UE. Thus, the event that triggers the uplink beam report may be a change in the top X best uplink beams for the UE, X being an integer number.

At 808, the base station receives the uplink beam report from the UE based on an occurrence of the event. The uplink beam report may be received, e.g., by the beam report component 948 of the apparatus 902 in FIG. 9. The uplink beam report may include aspects described in connection with the uplink beam report 513 in FIG. 5. The uplink beam report may identify each beam using an uplink beam ID. The uplink beam ID may be based on at least one of a spatial relation information identifier, an uplink TCI state ID, or an uplink beam indication reference signal ID. The uplink beam report may be received in a PUCCH, a MAC-CE, a scheduling request, or an uplink random access transmission.

The uplink beam report may include a beam quality metric for one or more beam reported in the uplink beam report, e.g., for each beam in the report. The beam quality metric(s) in the report may include or be based on at least one of an available power headroom or a measurement based on an uplink RSRP. The beam quality metric may be determined, by the UE, as a maximum allowed uplink transmission power minus path loss, for example.

As illustrated at 804, the base station may configure the UE for the beam quality metric. The configuration may be performed, e.g., by the beam quality metric component 942 of the apparatus 902 in FIG. 9. The configuration may include aspects described in connection with the configuration 505 in FIG. 5. Therefore, the beam quality metric that the base station receives in the uplink beam report may be based on the configured beam quality metric from the base station.

The uplink beam report may indicate, for one or more uplink beam included in the uplink beam report, whether the beam suffers beam failure. For example, for each beam in the report, the uplink beam report may indicate whether or not the beam in the report experiences a beam failure. For example, the uplink beam report may include a bitmap for each configured uplink beam of the UE.

As illustrated at 806, the base station may configure the UE for determining the beam failure. The configuration may be performed, e.g., by the beam failure component 944 of the apparatus 902 in FIG. 9. The configuration may include aspects described in connection with the configuration 507 in FIG. 5. Therefore, the indication of whether or not a particular beam suffers from beam failure in the uplink beam report may be based on one or more metrics configured by the base station for the UE to determine beam failure.

Figure 9:
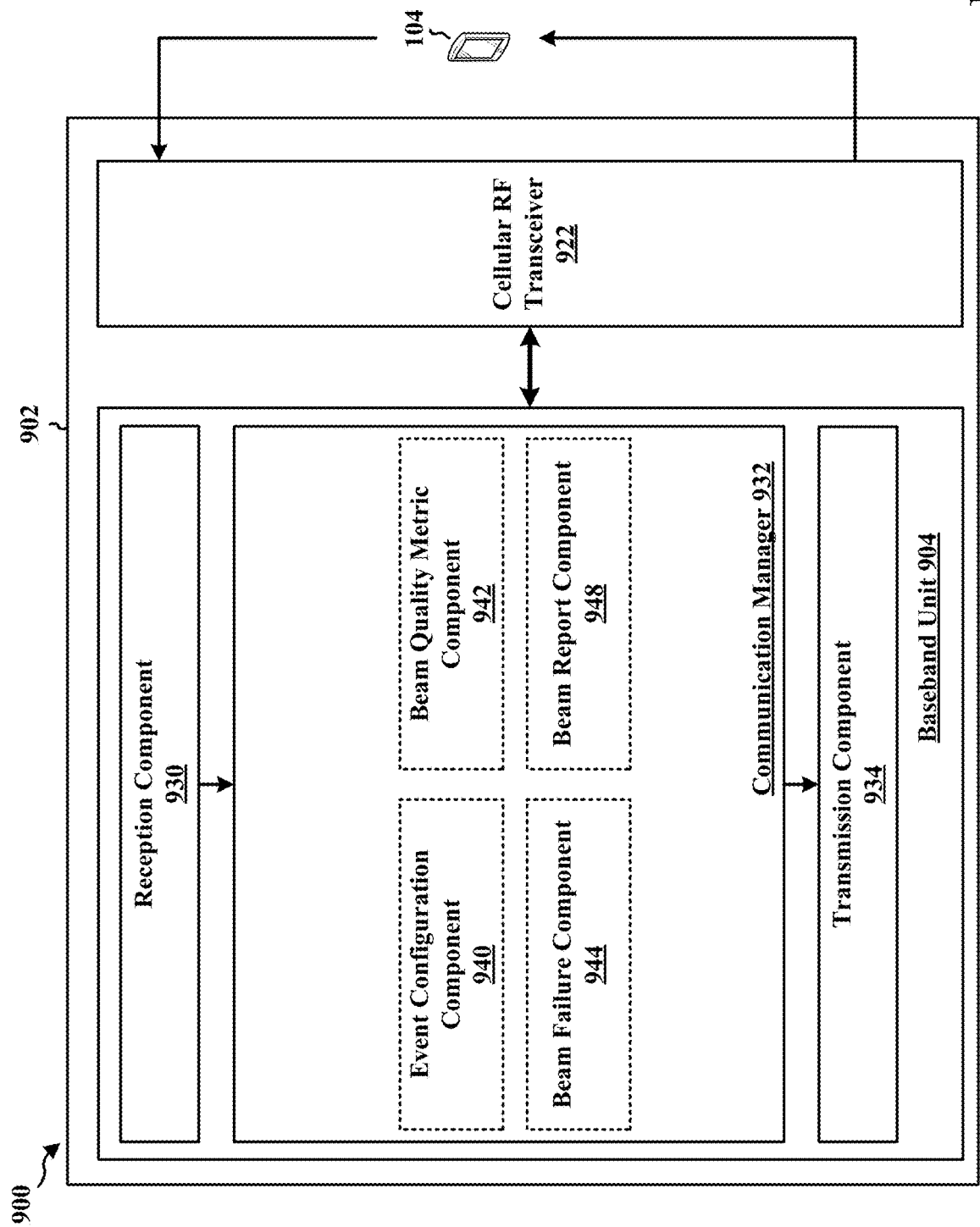
FIG. 9 is a diagram illustrating an example of a hardware implementation for an example apparatus for wireless communication at a base station.

FIG. 9 is a diagram 900 illustrating an example of a hardware implementation for an apparatus 902. The apparatus 902 is a base station and includes a baseband unit 904. The baseband unit 904 may communicate through a cellular RF transceiver 922 with the UE 104. The baseband unit 904 may include a computer-readable medium/memory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband unit 904. The baseband unit 904 may be a component of the base station 310 and may include the memory 376 and/or at least one of the TX processor 316, the RX processor 370, and the controller/processor 375.

The communication manager 932 includes an event configuration component 940 that is configured to configure a UE for an event that triggers an uplink beam report from the UE, e.g., as described in connection with 802 in FIG. 8. The communication manager 932 includes a beam report component 948 that is configured to receive the uplink beam report from the UE based on an occurrence of the event, e.g., as described in connection with 808 in FIG. 8. The communication manager 932 includes a beam quality metric component 942 that is configured to configure the UE for the beam quality metric, e.g., as described in connection with 804 in FIG. 8. The communication manager 932 includes a beam failure component 944 that is configured to configure the UE with a metric for determining the beam failure, e.g., as described in connection with 806 in FIG. 8.

The apparatus 902 may include additional components that perform each block in the aforementioned flowchart of FIG. 8 and aspects performed by the base station 504 in FIG. 5. As such, each block in the flowchart of FIG. 8 and the aspects performed by the base station 504 in FIG. 5 may be performed by at least one component of a wireless apparatus 902. The component may be one or more hardware components specifically configured to carry out the stated processes/algorithm, implemented by a processor configured to perform the stated processes/algorithm, stored within a computer-readable medium for implementation by a processor, or some combination thereof.

The components may be software components running in a processor, resident/stored in the computer readable medium/memory, one or more hardware components coupled to the processor, or some combination thereof. The system may be a component of the base station 310 and may include the memory 376 and/or at least one of the TX processor 316, the RX processor 370, and the controller/processor 375. Alternatively, the processing system may be the entire base station (e.g., see 310 of FIG. 3).

In one configuration, an apparatus for wireless communication includes means for configuring a UE for an event that triggers an uplink beam report from the UE and means for receiving the uplink beam report from the UE based on an occurrence of the event. The apparatus may further include means for configuring the UE for the beam quality metric. The apparatus may further include means for configuring the UE with a metric for determining the beam failure. The aforementioned means may be one or more of the aforementioned components of the apparatus and/or the processing system of the apparatus configured to perform the functions recited by the aforementioned means. As described supra, the processing system may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The following aspects are illustrative only and may be combined with aspects of other examples or teaching described herein, without limitation.

Aspect 1 is a method of wireless communication at a UE, comprising: determining, at the UE, an occurrence of an event based on one or more of criteria determined by the UE or a configuration from a base station, the event triggering an uplink beam report for the UE; and sending the uplink beam report to a base station in response to determining the occurrence of the event.

In Aspect 2, the method of Aspect 1 further includes that the determining the occurrence of the event is based on criteria determined by the UE.

In Aspect 3, the method of either Aspect 1 or Aspect 2 further includes receiving a configuration from the base station for the event, where the determining the occurrence of the event is based on the configuration.

In Aspect 4, the method of any of aspects 1-3 further includes that the event comprises a change in a set of one or more beams, wherein the determining the occurrence of the event comprises identifying a change in the set of the one or more beams.

In Aspect 5, the method of any of aspects 1-4 further includes that the set of one or more beams includes a first number of beams having highest beam measurements among a larger number of beams measured by the UE.

In Aspect 6, the method of any of aspects 1-5 further includes that the uplink beam report comprises a beam quality metric for an uplink beam reported in the uplink beam report, e.g., and may be included for each uplink beam in the report.

In Aspect 7, the method of any of aspects 1-6 further includes that the beam quality metric comprises at least one of an available power headroom or a measurement based on an uplink RSRP.

In Aspect 8, the method of any of aspects 1-7 further includes receiving a configuration from the base station for the beam quality metric.

In Aspect 9, the method of any of aspects 1-8 further includes that the uplink beam report indicates whether an uplink beam in the uplink beam report suffers beam failure, e.g., whether each uplink beam in the uplink beam report experiences a beam failure.

In Aspect 10, the method of any of aspects 1-9 further includes that the uplink beam report includes a bitmap for each configured uplink beam of the UE.

In Aspect 11, the method of any of aspects 1-10 further includes receiving a configuration from the base station for determining the beam failure.

In Aspect 12, the method of any of aspects 1-11 further includes that the uplink beam report identifies each beam using an uplink beam ID.

In Aspect 13, the method of any of aspects 1-12 further includes that the uplink beam ID is based on at least one of a spatial relation information identifier, an uplink TCI state ID, or an uplink beam indication reference signal ID.

In Aspect 14, the method of any of aspects 1-13 further includes that the uplink beam report is transmitted in a PUCCH, a MAC-CE, a scheduling request, or an uplink random access transmission.

Aspect 15 is a device including one or more processors and one or more memories in electronic communication with the one or more processors storing instructions executable by the one or more processors to cause the device to implement a method as in any of aspects 1-14.

Aspect 16 is a system or apparatus including means for implementing a method or realizing an apparatus as in any of aspects 1-14.

Aspect 17 is a non-transitory computer readable medium storing instructions executable by one or more processors to cause the one or more processors to implement a method as in any of aspects 1-14.

Aspect 18 is a method of wireless communication at a base station, comprising: configuring a UE for an event that triggers an uplink beam report from the UE; and receiving the uplink beam report from the UE based on an occurrence of the event.

In Aspect 19, the method of Example 18 further includes that the event comprises a change in a set of one or more beams.

In Aspect 20, the method of Example 18 or Example 19 further includes that the set of one or more beams includes a first number of beams having highest beam measurements among a larger number of beams measured by the UE.

In Aspect 21, the method of any of aspects 18-20 further includes that the uplink beam report comprises a beam quality metric for a beam reported in the uplink beam report, e.g., and may include the beam quality metric for each beam in the report.

In Aspect 22, the method of any of aspects 18-21 further includes that the beam quality metric comprises at least one of an available power headroom or a measurement based on an uplink RSRP.

In Aspect 23, the method of any of aspects 18-22 further includes configuring the UE for the beam quality metric.

In Aspect 24, the method of any of aspects 18-23 further includes that the uplink beam report indicates whether an uplink beam in the uplink beam report suffers beam failure, e.g., whether each uplink beam in the uplink beam report experiences a beam failure.

In Aspect 25, the method of any of aspects 18-24 further includes that the uplink beam report includes a bitmap for each configured uplink beam of the UE.

In Aspect 26, the method of any of aspects 18-25 further includes configuring the UE with a metric for determining the beam failure.

In Aspect 27, the method of any of aspects 18-26 further includes that the uplink beam report identifies each beam using an uplink beam ID.

In Aspect 28, the method of any of aspects 18-27 further includes that the uplink beam ID is based on at least one of a spatial relation information identifier, an uplink TCI state ID, or an uplink beam indication reference signal ID.

In Aspect 29, the method of any of aspects 18-28 further includes that the uplink beam report is received in a PUCCH, a MAC-CE, a scheduling request, or an uplink random access transmission.

Aspect 30 is a device including one or more processors and one or more memories in electronic communication with the one or more processors storing instructions executable by the one or more processors to cause the device to implement a method as in any of aspects 18-29.

Aspect 31 is a system or apparatus including means for implementing a method or realizing an apparatus as in any of aspects 18-29.

Aspect 32 is a non-transitory computer readable medium storing instructions executable by one or more processors to cause the one or more processors to implement a method as in any of aspects 18-29.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   determining, at the UE, an occurrence of an event associated with an uplink beam based on one or more of criteria determined by the UE or a configuration from a base station, the event triggering an uplink beam report for the UE; and
   sending the uplink beam report including information about at least one uplink beam to the base station in response to determining the occurrence of the event.

2. The method of claim 1, wherein the determining the occurrence of the event is based on the criteria determined by the UE.

3. The method of claim 1, further comprising:
   receiving the configuration from the base station for the event, wherein the determining the occurrence of the event is based on the configuration from the base station.

4. The method of claim 1, wherein the event comprises a change in a set of one or more uplink beams, wherein the determining the occurrence comprises identifying the change in the set of one or more uplink beams.

5. The method of claim 4, wherein the set of one or more uplink beams includes a first number of beams having highest beam measurements among a larger number of beams measured by the UE.

6. The method of claim 4, wherein the uplink beam report comprises a beam quality metric for each uplink beam reported in the uplink beam report.

7. The method of claim 6, wherein the beam quality metric comprises at least one of an available power headroom or a measurement based on an uplink reference signal received power (RSRP).

8. The method of claim 6, further comprising:
   receiving a beam quality metric configuration from the base station for the beam quality metric.

9. The method of claim 1, wherein the uplink beam report indicates whether each uplink beam in the uplink beam report suffers beam failure.

10. The method of claim 9, wherein the uplink beam report includes a bitmap for each configured uplink beam of the UE.

11. The method of claim 9, further comprising:
    receiving a beam failure configuration from the base station for determining the beam failure.

12. The method of claim 1, wherein the uplink beam report identifies each uplink beam using an uplink beam identifier (ID).

13. The method of claim 12, wherein the uplink beam ID is based on at least one of a spatial relation information identifier, an uplink transmission configuration indication (TCI) state ID, or an uplink beam indication reference signal ID.

14. The method of claim 1, wherein the uplink beam report is transmitted in a physical uplink control channel (PUCCH), a medium access control-control element (MAC-CE), a scheduling request, or an uplink random access transmission.

15. An apparatus for wireless communication at a user equipment (UE), comprising:
    a memory; and
    at least one processor coupled to the memory and configured to:
        determine, at the UE, an occurrence of an event associated with an uplink beam based on one or more of criteria determined by the UE or a configuration from a base station, the event triggering an uplink beam report for the UE; and
        send the uplink beam report including information about at least one uplink beam to the base station in response to determining the occurrence of the event.

16. The apparatus of claim 15, wherein the at least one processor is configured to determine the occurrence of the event based on the criteria determined by the UE.

17. The apparatus of claim 15, wherein the at least one processor is further configured to:
    receive the configuration from the base station for the event, a determination of the occurrence of the event being based on the configuration from the base station.

18. A method of wireless communication at a base station, comprising:
    configuring a user equipment (UE) for an event associated with an uplink beam that triggers an uplink beam report from the UE; and
    receiving the uplink beam report including information about at least one uplink beam from the UE based on an occurrence of the event.

19. The method of claim 18, wherein the event comprises a change in a set of one or more uplink beams.

20. The method of claim 19, wherein the set of one or more uplink beams includes a first number of uplink beams having highest beam measurements among a larger number of uplink beams measured by the UE.

21. The method of claim 19, wherein the uplink beam report comprises a beam quality metric for each uplink beam reported in the uplink beam report.

22. The method of claim 21, wherein the beam quality metric comprises at least one of an available power headroom or a measurement based on an uplink reference signal received power (RSRP).

23. The method of claim 21, further comprising:
    configuring the UE for the beam quality metric.

24. The method of claim 18, wherein the uplink beam report indicates whether the at least one uplink beam in the uplink beam report suffers beam failure.

25. The method of claim 24, wherein the uplink beam report includes a bitmap for each configured uplink beam of the UE.

26. The method of claim 24, further comprising:
configuring the UE with a metric for determining the beam failure.

27. The method of claim 18, wherein the uplink beam report identifies each uplink beam using an uplink beam identifier (ID).

28. The method of claim 27, wherein the uplink beam ID is based on at least one of a spatial relation information identifier, an uplink transmission configuration indication (TCI) state ID, or an uplink beam indication reference signal ID.

29. The method of claim 18, wherein the uplink beam report is received in a physical uplink control channel (PUCCH), a medium access control-control element (MAC-CE), a scheduling request, or an uplink random access transmission.

30. An apparatus for wireless communication at a base station, comprising:
a memory; and
at least one processor coupled to the memory and configured to:
configure a user equipment (UE) for an event associated with an uplink beam that triggers an uplink beam report from the UE; and
receive the uplink beam report including information about at least one uplink beam from the UE based on an occurrence of the event.

* * * * *